(12) United States Patent
Yamada et al.

(10) Patent No.: US 7,353,190 B2
(45) Date of Patent: Apr. 1, 2008

(54) GIFT-VALUABLE ARTICLE EXCHANGE ASSISTING DEVICE AND METHOD, AND COMPUTER PRODUCT

(75) Inventors: Kuniaki Yamada, Kawasaki (JP);
Mikio Fukuma, Kawasaki (JP);
Shigehiko Takayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 10/260,568

(22) Filed: Oct. 1, 2002

(65) Prior Publication Data

US 2003/0149637 A1    Aug. 7, 2003

(30) Foreign Application Priority Data

Feb. 5, 2002    (JP)    ............... 2002-028552

(51) Int. Cl.
*G06Q 30/00*    (2006.01)
(52) U.S. Cl. ............... 705/26; 705/1; 705/27; 705/28
(58) Field of Classification Search ............ 705/1, 705/26, 27; 715/700
See application file for complete search history.

(56) References Cited

U.S. PATENT DOCUMENTS

2003/0004815 A1 *   1/2003   Sakai et al. ............ 705/26
2003/0173401 A1 *   9/2003   Yamagami ............. 235/380
2004/0243478 A1 *  12/2004   Walker et al. .......... 705/26

FOREIGN PATENT DOCUMENTS

| JP | 09-311888 | * | 2/1997 |
| JP | 09-311888 | | 12/1997 |
| JP | 10-40463 | | 2/1998 |
| JP | 2001-338174 | | 12/2001 |
| JP | 2001-344531 | | 12/2001 |
| JP | 2002-024603 | | 1/2002 |
| JP | 2002-032681 | | 1/2002 |

OTHER PUBLICATIONS

William M. Bulkeley, E-Commerce—Click and Mortar—Those stodgy old traditional companies aren't about to just sit back and watch the new kids take over their business, Jul. 24, 2000, Asian Wall Street Journal, pp. 1-4.*
English translation of JP 09-311888.*
Japanese Search Report.
Japanese Patent Office Action, mailed Mar. 6, 2007, and issued in priority Japanese Patent Application No. 2002-028552.

\* cited by examiner

*Primary Examiner*—Jeffrey A. Smith
*Assistant Examiner*—Jason B. Dunham
(74) *Attorney, Agent, or Firm*—Staas & Halsey LLP (57) ABSTRACT

A gift-valuable article exchange assisting device includes a control section which, when a receiver decides that a gift belonging to the receiver is unwanted to the receiver, determines whether the gift can be exchanged to a valuable article belonging to a delivery person based on an exchangeable article information database. The control section also calculates a predetermined service charge when it is determined that the exchange is possible, and decides a valuable article, to which the gift is actually exchanged, equivalent to a value obtained by subtracting the service charge from a value of the gift based on exchange conditions between the gift and the valuable article.

6 Claims, 10 Drawing Sheets

| GIFT ARTICLE NUMBER | COMPANY NAME | DESIRED DELIVERY DATE | DESIRED DELIVERY TIME | SIZE | GIFT CONTENTS | ADDRESS FOR DELIVERY |
|---|---|---|---|---|---|---|
| 00000001 | XX DEPARTMENT STORE | 2001/11/15 | BEFORE NOON | 80 SIZE | BEER | TOKYO … |
| 00000002 | XX DEPARTMENT STORE | 2001/11/15 | 18-20 | 60 SIZE | CANNED GOODS | KANAGAWA … |
| 00000003 | XX DEPARTMENT STORE | 2001/11/15 | 12-14 | 60 SIZE | SAKE | KANAGAWA … |

| NAME FOR DELIVERY | TELEPHONE NUMBER FOR DELIVERY | ADDRESS OF CONSIGNOR | NAME OF CONSIGNOR | TELEPHONE NUMBER OF CONSIGNOR |
|---|---|---|---|---|
| SATO TAKASHI | 03-3456-2222 | OSAKA … | KIDO KOJI | 06-3651-3333 |
| FUJIWARA DAISUKE | 045-654-3210 | TOKYO … | NISIDA SUSUMU | 03-4567-8911 |
| TANAKA MASAKI | 045-634-5678 | SAITAMA … | GOTO SHINICHI | 047-333-2222 |

FIG.3

| DELIVERY NUMBER | COMPLETION FLAG | GIFT ARTICLE NUMBER | | TELEPHONE NUMBER OF CONSIGNOR |
|---|---|---|---|---|
| 00000001 | 0 | 00000001 | | 06-3651-3333 |
| 00000002 | 0 | 00000002 | | 03-4567-8911 |
| 00000003 | 0 | 00000003 | | 047-333-2222 |

| DELIVERY NUMBER | GIFT CONTENTS | SIZE | EQUIVALENT-VALUE ARTICLE | SERVICE CHARGE | ARTICLE ACTUALLY EXCHANGED | ADDRESS FOR RETURN |
|---|---|---|---|---|---|---|
| 000000011 | BEER | 80 SIZE | MERCHANDISE COUPONS 3000 YEN | 500 YEN | MERCHANDISE COUPONS 2500 YEN | TOKYO ... |
| 000000321 | COOKING OIL | 100 SIZE | MERCHANDISE COUPONS 3000 YEN | 700 YEN | MERCHANDISE COUPONS 2300 YEN | KANAGAWA ... |
| 000000567 | LAVER | 60 SIZE | MERCHANDISE COUPONS 2000 YEN | 300 YEN | MERCHANDISE COUPONS 1700 YEN | OSAKA ... |

| GIFT CONTENTS | EQUIVALENT-VALUE ARTICLE |
|---|---|
| BEER | MERCHANDISE COUPONS 3000 YEN |
| CANNED GOODS | MERCHANDISE COUPONS 3000 YEN |
| COOKING OIL | MERCHANDISE COUPONS 3000 YEN |

| SIZE | ADDRESS OF CONSIGNOR | ADDRESS FOR DELIVERY | SERVICE CHARGE |
|---|---|---|---|
| 60 SIZE | HOKKAIDO··· | HOKKAIDO··· | 300 YEN |
| 60 SIZE | HOKKAIDO··· | TOHOKU··· | 500 YEN |
| 60 SIZE | HOKKAIDO··· | KANTO··· | 700 YEN |

XX TRANSPORT

THURSDAY, NOVEMBER 15, 2001 11:13

GIFT CONTENTS
   BEER     1

NAME OF CONSIGNOR
   KIDO KOUJI

PERSON IN CHARGE OF DELIVERY
   SAWADA

XX TRANSPORT

THURSDAY, NOVEMBER 15, 2001 11:13

GIFT CONTENTS
   BEER     1

EQUIVALENT-VALUE ARTICLE
   MERCHANDISE COUPONS   3,000
   SERVICE CHARGE           500

MERCHANDISE COUPONS   2,500

I AGREE TO TAKE BACK THE GIFT ARTICLE
                            SIGNATURE PERSON IN CHARGE OF DELIVERY
   SAWADA

FIG.12

GIFT-VALUABLE ARTICLE EXCHANGE ASSISTING DEVICE AND METHOD, AND COMPUTER PRODUCT

FIELD OF THE INVENTION

The present invention relates to a gift-valuable article exchange assisting device and method, and a computer product which make it possible to easily and efficiently perform an exchange of gifts and valuable articles.

BACKGROUND OF THE INVENTION

Conventionally, in midyear gift-giving and year-end gift-giving seasons, some people receive the same gifts from different consignors or unwanted gifts, and may have difficulty to dispose the gifts. Therefore, a gift retailer such as a department store offers exchange service that the gifts are exchanged to valuable articles such as other articles of commerce, or merchandise coupons.

In the above-mentioned conventional exchange service, a receiver of a gift must inconveniently carry the gift to a department store or the like.

In the conventional exchange service, some of the gifts are rejected to be exchanged because they are perishable goods or campaign packets such as novelty goods. Therefore, conventionally, the receiver has no idea whether a department store accepts the gift as an exchangeable one before actually bringing the gift in the department store. Once it is found that the department store does not accept the gift article, the receiver has to bring it back, which is wasteful at all.

SUMMARY OF THE INVENTION

It is an object of this invention to provide a gift-valuable article exchange assisting device and method, and a computer product which make it possible to easily and efficiently perform an exchange of a gift and a valuable article.

The gift-valuable article exchange assisting device according to one aspect of this invention comprises a memory unit which stores exchangeable article information that indicates whether a gift can be exchanged to a valuable article and stores exchange conditions in correspondence with the gifts and the valuable articles that can be exchanged. The device also comprises a determination unit which, when a first party decides that a gift belonging to the first party is unwanted to the first party, determines whether the gift can be exchanged to a valuable article belonging to a second party based on the exchangeable article information stored in the memory unit. The device further comprises a calculation unit which calculates a predetermined service charge when the decision unit decides that the exchange is possible, and a decision unit which decides a valuable article, to which the gift can be actually exchanged, equivalent to a value obtained by subtracting the service charge from a value of the gift based on the exchange conditions.

The gift-valuable article exchange assisting method according to another aspect of this invention comprises a step of storing exchangeable article information that indicates whether a gift can be exchanged to a valuable article and storing exchange conditions in correspondence with the gifts and the valuable articles that can be exchanged, in a memory unit. The method also comprises steps of collectively downloading delivery management information related to delivery of a gift from a delivery management device at the start of a delivery affair, and determining, when a first party decides that the gift belonging to the first party is unwanted to the first party, whether the gift can be exchanged to a valuable article belonging to a second party based on the exchangeable article information stored in the memory unit. The method further comprises steps of calculating a predetermined service charge when it is determined that the exchange is possible in the determination step, deciding a valuable article, to which the gift is actually exchanged, equivalent to a value obtained by subtracting the service charge from a value of the gift based on the exchange conditions, and uploading exchange result information to the delivery management device after completion of all delivery affairs.

The computer program according to still another aspect of this invention contains instructions which when executed on a computer causes the computer to execute the gift-valuable article exchange assisting method.

Other objects and features of this invention will become apparent from the following description with reference to the accompanying drawings.

DETAILED DESCRIPTION

Embodiments of the gift-valuable article exchange assisting device and method according to the present invention will be described below with reference to the accompanying drawings.

Figure 1:
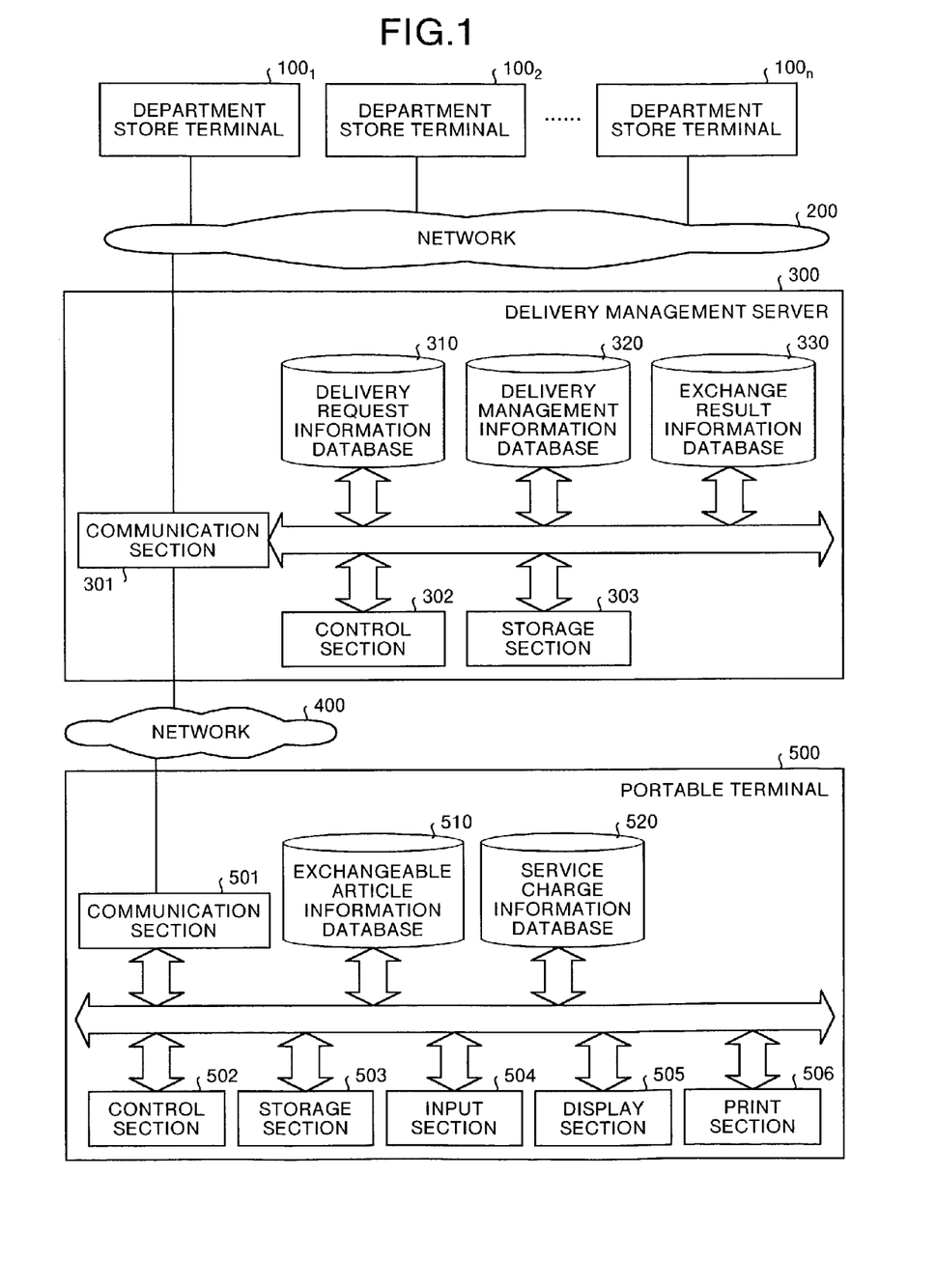
FIG. 1 is a block diagram which shows the configuration of an embodiment of the present invention.

FIG. 1 is a block diagram which shows the structure of an embodiment according to the present invention. In FIG. 1, department store terminals $100_1$ to $100_n$ are computer terminals installed in department stores of n companies, from which delivery request information is transmitted to a delivery management server 300 via a network 200.

Figure 2:
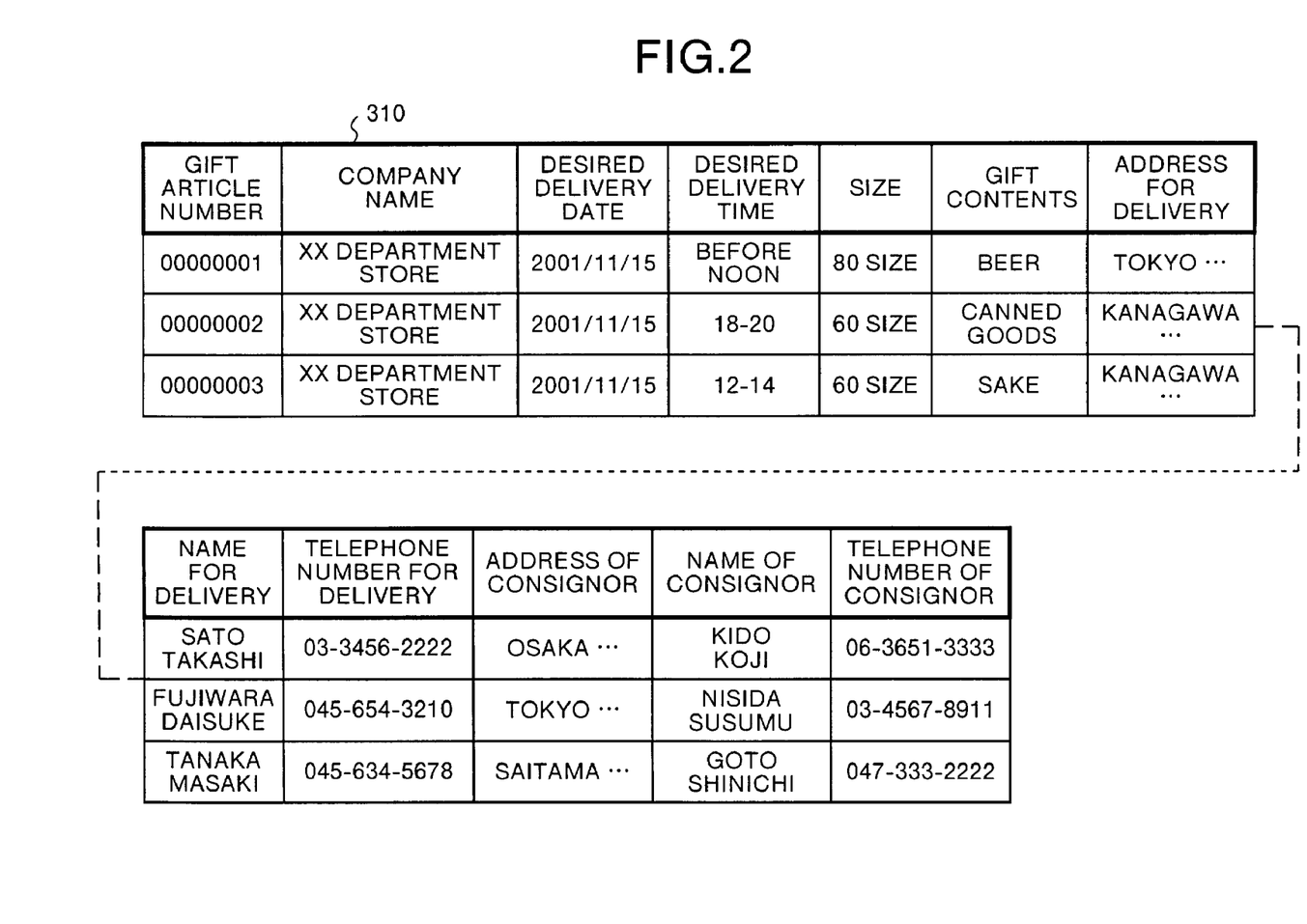
FIG. 2 is a diagram which shows a table structure of a delivery request information database 310 shown in FIG. 1.

Each department store sells gifts such as midyear gifts or end-year gifts. The department store receives orders from consignors and requests a delivery company (or a second party in claims) to deliver the gifts to receivers (or a first party in the claims). Delivery request information is constituted by "gift article number", "company name", "desired delivery date", "desired delivery time", "size", "gift contents", "address for delivery", "name of receiver", "telephone number for delivery", "address of consignor", "name of consignor", and "telephone number of consignor" which are shown in FIG. 2.

The "gift article number" is a number for identifying a gift. The "company name" is the name of a department store. The "desired delivery date" is a desired date for delivery of a gift. The "desired delivery time" is desired time for delivery of a gift. The "size" is a size (depth+width +height) of a gift (pack to be delivered). The "gift contents" are the contents of a gift such as beer or canned goods.

The "address for delivery" is the address of a receiver of a gift. The "name for delivery" is the name of a receiver. The "telephone number for delivery" is the telephone number of a receiver. The "address of consignor" is the address of a consignor of a gift. The "name of consignor" is the name of a consignor. The "telephone number of consignor" is the telephone number of a consignor.

Returning to FIG. 1, the delivery management server 300 is a server which is arranged on the delivery company side, which accepts a delivery request of a gift from a department store, and performs management of delivery and exchange result of gifts and valuable articles (merchandise coupons or the like).

In this delivery management server 300, a communication section 301 controls communications with an external terminal according to a predetermined communication protocol. A control section 302 controls respective sections of the delivery management server 300. The details of the operation of the control section 302 will be described later. The storage unit 303 stores various pieces of information used in the control section 302.

A delivery request information database 310 is a database in which pieces of delivery request information transmitted from the department store terminals $100_1$ to $100_n$ are stored. More specifically, the delivery request information database 310 has fields, as described above, of "gift article number", . . . , "telephone number of consignor" shown in FIG. 2.

Returning to FIG. 1, a delivery management information database 320 is a database in which delivery management information used for performing delivery management of gifts is stored. More specifically, as shown in FIG. 3, the delivery management information database 320 has fields of "delivery number", "completion flag", "gift article number", . . . , "telephone number of consignor".

The "delivery number" is a number for identifying deliveries on the delivery company side. The "completion flag" is a flag representing completion of delivery. When the delivery is completed, the "completion flag" is set at 1. On the other hand, when the delivery is not completed, the "completion flag" is set at 0. The "gift article number", . . . , "telephone number of consignor" correspond to the "gift article number", . . . , "telephone number of consignor" shown in FIG. 2, respectively.

Figure 4:
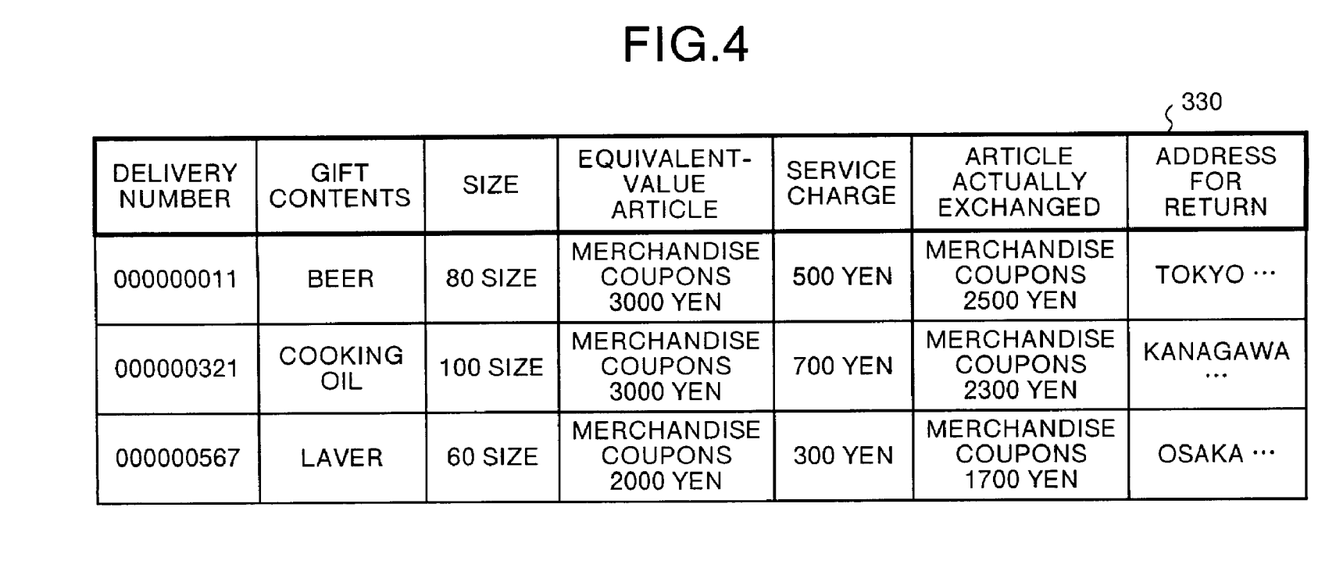
FIG. 4 is a diagram which shows a table structure of an exchange result information database 330 shown in FIG. 1.

Returning to FIG. 1, an exchange result information database 330 is a database in which exchange result information related to achievement of exchanges of gifts and valuable articles is stored. More specifically, the exchange result information database 330, as shown in FIG. 4, has fields of "delivery number, "gift contents", "size", "equivalent-value article", "service charge", "article actually exchanged", and "address for return".

Figure 3:
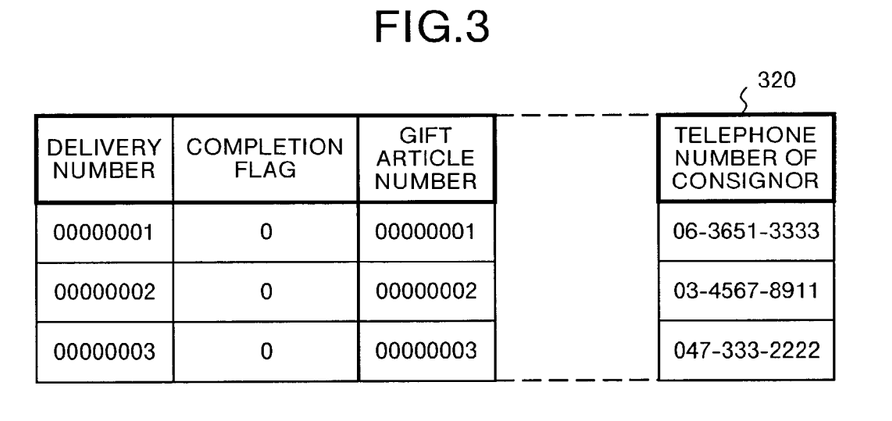
FIG. 3 is a diagram which shows a table structure of a delivery management information database 320 shown in FIG. 1.

The "delivery number" corresponds to the "delivery number shown in FIG. 3. The "gift contents" and the "size" correspond to the "gift contents" and the "size" (not shown) of the delivery management information database 320 shown in FIG. 3, respectively. The "equivalent-value article" indicates that a gift is exchangeable to a "valuable article" equivalent to a value of the gift with "service charge" included, described later.

The "service charge" is a service charge paid to a delivery company in an exchange affair which is an agency affair of a receiver of a gift. The "article actually exchanged" indicates a valuable article that is actually exchanged and corresponds to a price obtained by subtracting the "service charge" from the price of the exchangeable article (or the gift). The "address for return" is information related to an address for return, that is, the address of a department store which has sold a gift exchanged to a valuable article.

Returning to FIG. 1, a portable terminal 500 is a terminal which is carried by a delivery person (who is included in the second party in the claims), and is used for assisting in an exchange of a gift to a valuable article, calculation of a service charge, printing of various slips (see FIGS. 10 and 11), and delivery management. The portable terminal 500 is connected to the delivery management server 300 via a network 400 at the start of a delivery affair (in a download process) and upon completion of the delivery affair (in an upload process).

In this portable terminal 500, a communication section 501 controls communications with the delivery management server 300 according to a predetermined communication protocol. A control section 502 controls respective sections of the portable terminal 500. The details of the operation of the control section 502 will be described later. A storage section 503 stores various pieces of information used in the control section 502.

An input section 504 is constituted by ten keys, function keys, and the like. A display section 505 is a liquid-crystal display or the like, and displays various pieces of information required for exchange affair. A print section 506 prints a gift article statement 800 (see FIG. 10) and an exchange result statement 900 (see FIG. 11) which will be described later.

Figure 5:
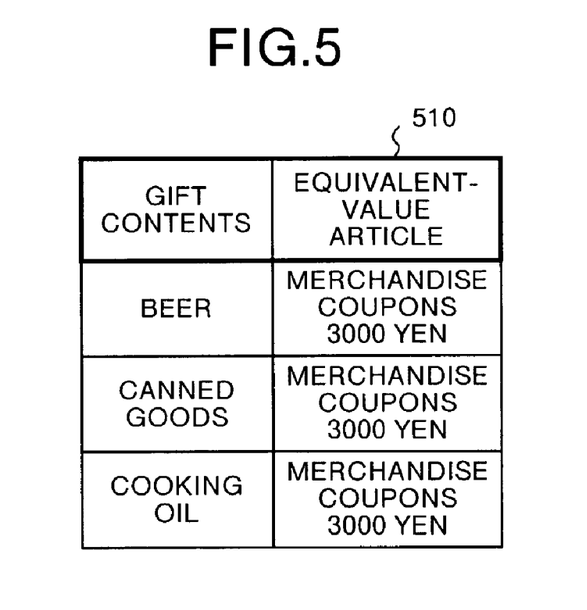
FIG. 5 is a diagram which shows a table structure of an exchangeable article information database 510 shown in FIG. 1.

An exchangeable article information database 510 is a database which stores exchangeable article information representing the relationship between gift contents and target articles for exchange. More specifically, the exchangeable article information database 510, as shown in FIG. 5, has fields of "gift contents" and "equivalent-value article". The "gift contents" correspond to the "gift contents" of the delivery request information database 310 and the delivery management information database 320. The "equivalent-value article" is information related to a valuable article (merchandise coupons or the like) to which a gift can be exchanged.

Figure 6:
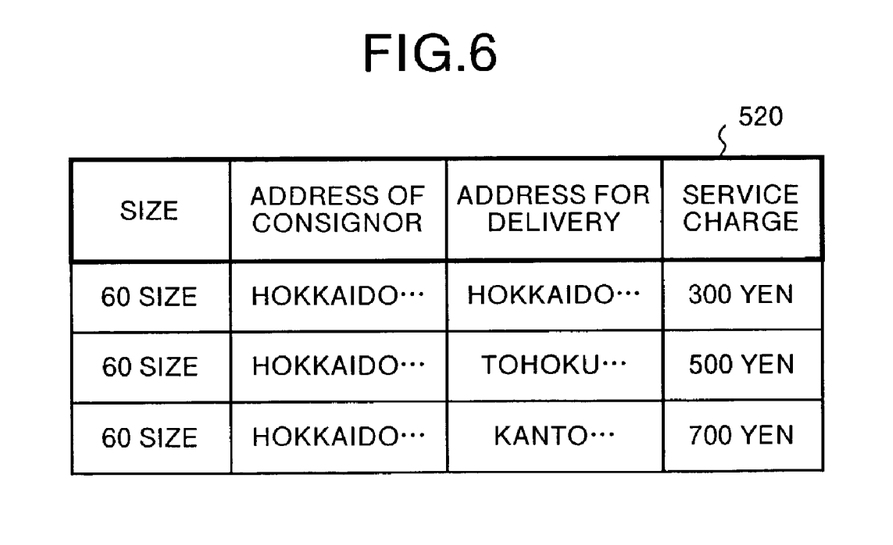
FIG. 6 is a diagram which shows a table structure of a service charge information database 520 shown in FIG. 1.

Returning to FIG. 1, a service charge information database 520 is a database which stores service charge information related to a service charge paid in an exchange of a gift and a valuable article. More specifically, the service charge information database 520, as shown in FIG. 6, has fields of "size", "address of consignor", "address for delivery", and "service charge".

The "size", the "address of consignor", and the "address for delivery" correspond to the "size", the "address of consignor", and the "address for delivery" of the delivery request information database 310 and the delivery management information database 320, respectively. The "service charge" is information related to a service charge required for an exchange.

Figure 7:
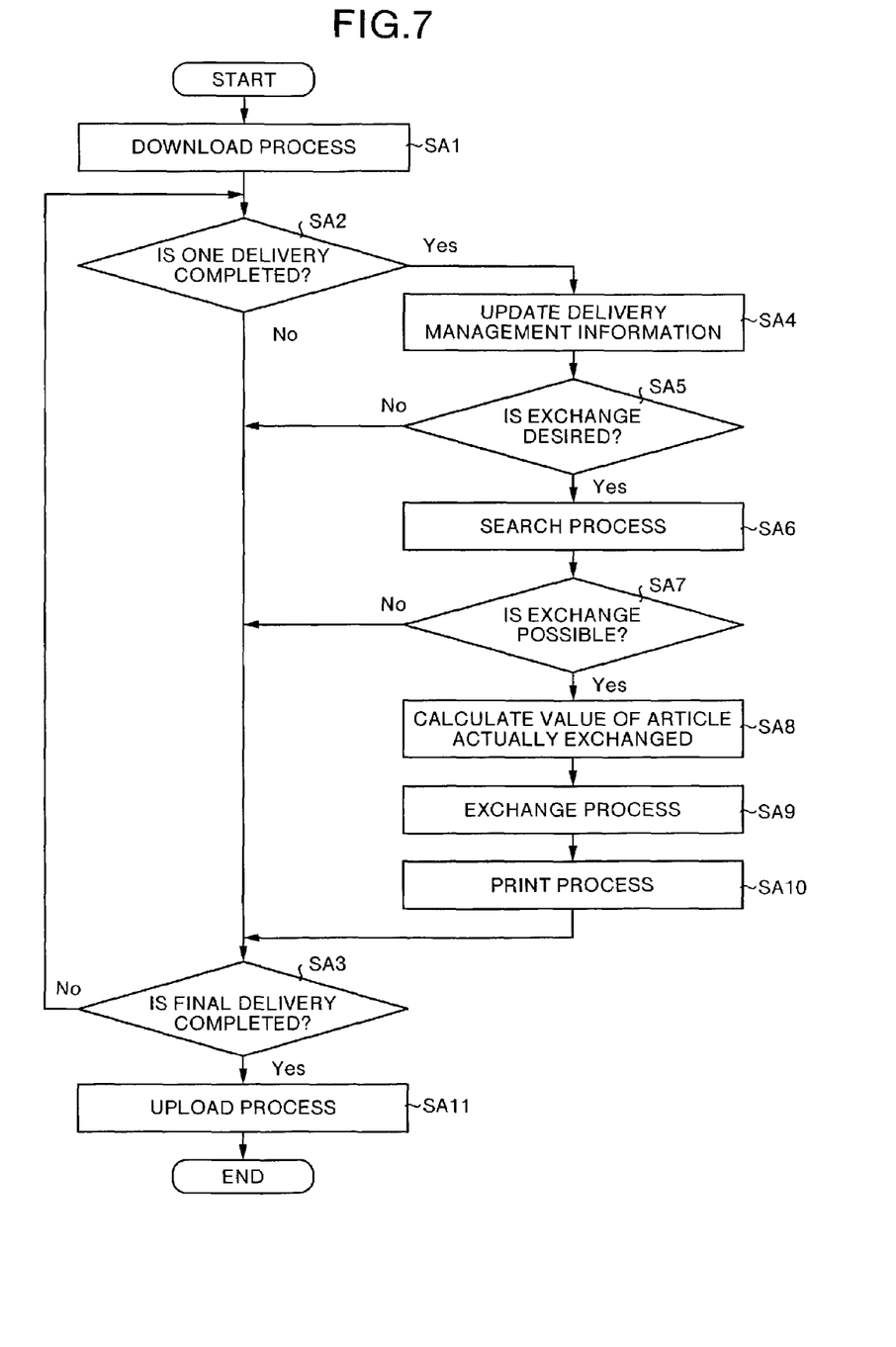
FIG. 7 is a flow chart which explains an operation of a portable terminal 500 shown in FIG. 1.
Figure 8:
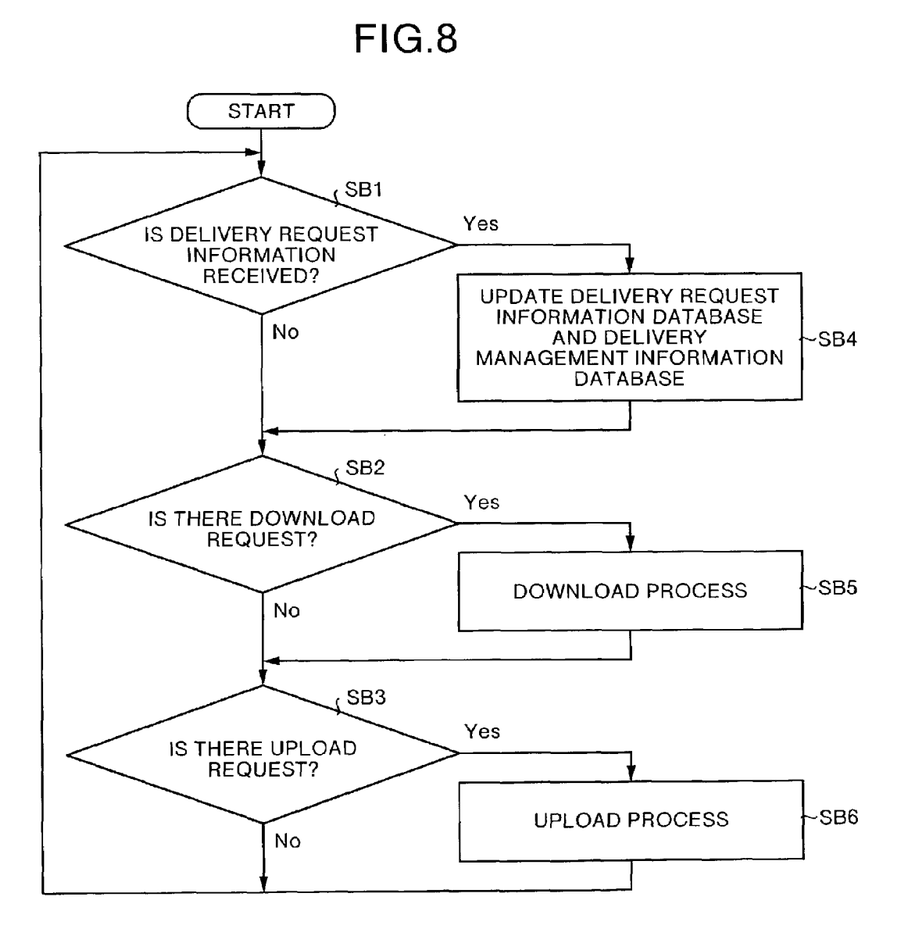
FIG. 8 is a flow chart which explains an operation of a delivery management server 300 shown in FIG. 1.

The operation of another embodiment will be described below with reference to flow charts shown in FIGS. 7 and 8. FIG. 7 is a flow chart which explains the operation of the portable terminal 500 shown in FIG. 1. FIG. 8 is a flow chart which explains the operation of the delivery management server 300 shown in FIG. 1.

At step SB1 shown in FIG. 8, the control section 302 of the delivery management server 300 decides whether any one of the department store terminals $100_1$ to $100_n$ receives delivery request information or not. In this instance, the decision result is assumed to be "No".

At step SB2, the control section 302 decides whether the delivery management server 300 receives a download request from the portable terminal 500 or not. In this instance, the decision result is assumed to be "No". This download request is made at the start of a delivery affair and is a request for downloading delivery management information for that day from the delivery management server 300 to the portable terminal 500 via the network 400.

At step SB3, the control section 302 decides whether the delivery management server 300 receives an upload request from the portable terminal 500 or not. In this instance, the decision result is assumed to be "No". This upload request is made upon completion of a delivery affair and is a request for uploading delivery management information and exchange result information of that day from the portable terminal 500 to the delivery management server 300 via the network 400. Subsequently, the control section 302 repeats the decisions at step SB1 to step SB3.

For example, when the delivery management server 300 receives delivery request information ("gift article number", . . . , "telephone number for delivery") from the department store $100_j$, the control section 302 of the delivery management server 300 sets the decision result at step SB1 as "Yes". At step SB4, the control section 302 stores the received delivery request information in the delivery request information database 310 (see FIG. 2). The control section 302 stores the delivery request information in correlation with "delivery number" in the delivery management information database 320 (see FIG. 3).

Figure 9:
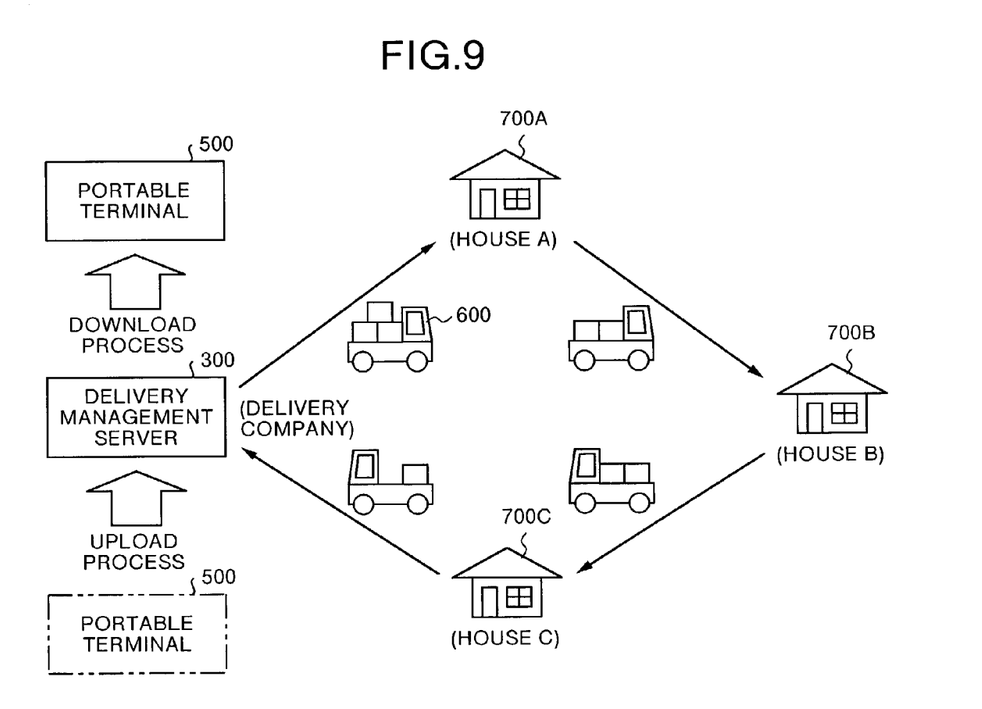
FIG. 9 is a diagram which explains an outline of the operation of the embodiment.

As shown in FIG. 9, at the start of the delivery affair, a delivery person operates a predetermined key of the input section 504 after the portable terminal 500 is connected to the delivery management server 300 through the network 400. At step SA1 shown in FIG. 7, the control section 502 executes a download process. More specifically, the control section 502 outputs a download request through the network 400.

In this manner, the control section 302 of the delivery management server 300 sets the decision result at step SB2 shown in FIG. 8 as "Yes". At step SB5, the control section 302 downloads the delivery management information for that day from the delivery management information database 320 shown in FIG. 3 into the portable terminal 500. In this instance, the control section 502 of the portable terminal 500 stores the downloaded delivery management information in the storage section 503.

Upon completion of the download process, the delivery person loads the gifts (packs) on a delivery vehicle 600 shown in FIG. 9 and starts delivery of the gifts while carrying the portable terminal 500 in a scheduled order: house A 700A →house B 700B→house C 700C.

At step SA2, the control section 502 of the portable terminal 500 decides whether one delivery is completed or not. In this instance, the decision results are assumed to be "No". At step SA3, the control section 502 decides whether final delivery is completed or not. In this instance, the decision results are assumed to be "No". Subsequently, the control section 502 repeats the decisions at step SA2 and step SA3.

The delivery person operates the input section 504 of the portable terminal 500 to display delivery management information related to the house A 700A and drives the delivery vehicle 600 toward the house A 700A. When the delivery vehicle 600 arrives at the house A 700A, the delivery person delivers the gift at the house A 700A and operates the input section 504.

In this manner, the control section 502 sets the decision result at step SA2 shown in FIG. 7 as "Yes". At step SA4, the control section 502 updates a "completion flag" of the delivery management information corresponding to the house A 700A of the delivery management information stored in the storage section 503, from 0 to 1.

At step SA5, the control section 502 decides whether the receiver of the gift desires to exchange the gift to a valuable article based on the operation state of the input section 504. More specifically, the delivery person explains that the gift is exchangeable to a valuable article, to the receiver of the gift and confirms whether the gift is required to be exchanged to the valuable article or not. In this state, when the receiver does not desire to exchange the gift, the delivery person operates a predetermined key of the input section 504. In this manner, the control section 502 sets the decision result at step SA5 as "No".

On the other hand, when the receiver of the gift desires to exchange the gift, the delivery person operates the predetermined key of the input section 504. In this manner, the control section 502 sets the decision result in step SA5 as "Yes".

At step SA6, the control section 502 searches the exchangeable article information database 510 shown in FIG. 5 for an equivalent-value article by using "gift contents" as a key, of delivery management information corresponding to the gift. At step SA7, the control section 502 decides whether the equivalent-value article has been searched for or not at step SA6, i.e., whether the gift can be exchanged or not. When the equivalent-value article has not been searched for, the control section 502 sets the decision result at step SA7 as "No".

On the other hand, when the decision result at step SA7 is "Yes", at step SA8, the control section 502 searches the service charge information database 520 shown in FIG. 6 for a service charge by using the "size", the "address of consignor", and the "address for delivery" of the delivery management information of the gift as keys.

The control section 502 obtains a price (the price of an article to which a gift is actually exchanged) through calculation of subtracting the service charge from the price of the equivalent-value article for exchange (see FIG. 5) at step SA6. For example, when the price of the exchangeable gift article is 3,000 yen and the service charge is 500 yen, the value of the article to be actually exchanged is 2,500 yen.

At step SA9, an exchange process is executed. More specifically, the receiver exchanges the gift to the article with a net value (e.g., merchandise coupons of 2,500 yen) with the delivery person. In this manner, the receiver receives the merchandise coupons of 2,500 yen, and the delivery person receives the gift. The gift is returned to the department store which is the sender. The control section 502 forms exchange result information (see FIG. 4) related to the gift through an operation of the input section 504 as a trigger, and stores the exchange result information in the storage section 503.

Figure 10:
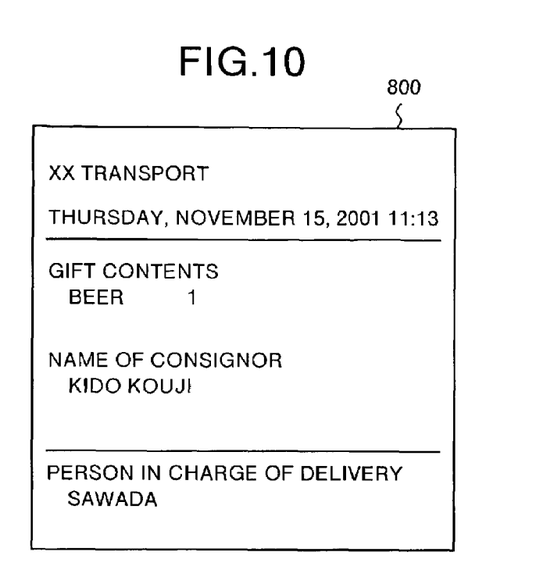
FIG. 10 is a diagram which shows a printed example of a gift article statement 800 in the embodiment.
Figure 11:
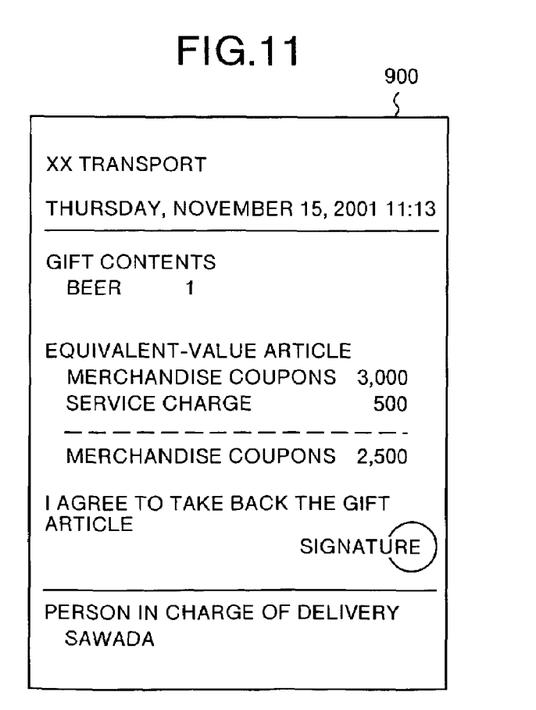
FIG. 11 is a diagram which shows a printed example of an exchange result statement 900 in the embodiment.

At step SA10, the control section 502 instructs the print section 506 to print the gift article statement 800 shown in FIG. 10 and the exchange result statement 900 shown in FIG. 11. The gift article statement 800 is a statement of the gift in which information constituted by the name of a delivery company, a delivery date and time, gift contents, the name of a consignor, a delivery person, and the like is printed. The exchange result statement 900 is a statement in which information constituted by the name of a delivery company, an exchange date and time, gift contents, an equivalent-value article (merchandise coupons, service charge), a delivery person, and the like is printed.

The gift article statement 800 and the exchange result statement 900 are given to a receiver. Therefore, the receiver can recognize what the original gift is by checking the exchange result statement 900 after the gift is exchanged to the valuable article, and gives a reward to the consignor.

At step SA3, the control section 502 decides whether the final delivery affair is completed or not. In this instance, the decision result is assumed to be "No". Subsequently, delivery (exchange) affairs to the house B 700B and the house C 700C shown in FIG. 9 are executed. Upon completion of the final delivery affair, the control section 502 sets the decision result at step SA3 as "Yes".

At step SA11, an upload process is executed. More specifically, the delivery person connects the portable terminal 500 to the delivery management server 300 via the network 400 and then operates a predetermined key of the input section 504. In this manner, the control section 502 outputs an upload request via the network 400 and uploads the delivery management information and the exchange result information stored in the storage section 503.

In this manner, the control section 302 of the delivery management server 300 sets the decision result at step SB3 shown in FIG. 8 as "Yes". At step SB6, the control section 302 stores the uploaded delivery management information in the delivery management information database 320 (see FIG. 3) and stores the exchange result information in the exchange result information database 330 (see FIG. 4).

As described above, according to the embodiment, in a delivery affair, when the gift is decided as an unwanted gift by the receiver and decided as an exchangeable article by the control section 502, a predetermined service charge is calculated based on the service charge information database 520 (see FIG. 6), and an article actually exchanged (see FIG. 4) having a value obtained by subtracting the service charge from the price of the gift is determined based on the exchange conditions between the target article to be exchanged and the gift. For this reason, the exchange of the gift and the article actually exchanged (valuable article) can be easily and efficiently performed.

According to the embodiment, at the start of a delivery affair, the delivery management information related to the delivery of gifts is collectively downloaded from the delivery management server 300 (step SA1: see FIG. 7). Thus, the delivery affair can be efficiently performed.

According to the embodiment, the portable terminal 500 stores the exchange result information related to the exchange of a gift and an article actually exchanged (valuable article) and shows the exchange result information to a receiver with the exchange result statement 900. Thus, the receiver can recognize what the gift is, and can avoid an impolite attitude to a consignor.

According to the embodiment, upon completion of the delivery affair, the exchange result information is uploaded to the delivery management server 300. Thus, the delivery affair can be made more efficient.

According to the embodiment, by exchanges of gifts to valuable articles, demand of taking gifts back by using service charges as counter values can be evoked to delivery companies. In addition, since department stores entrust exchange affairs to delivery companies, costs and time required for the exchanges can be reduced.

The embodiment according to the present invention has been described in detail above with reference to the accompanying drawings. However, a concrete configuration is not limited to the embodiment, and a change in design in the range where does not deviate from the spirit and scope of the invention is included in the invention.

Figure 12:
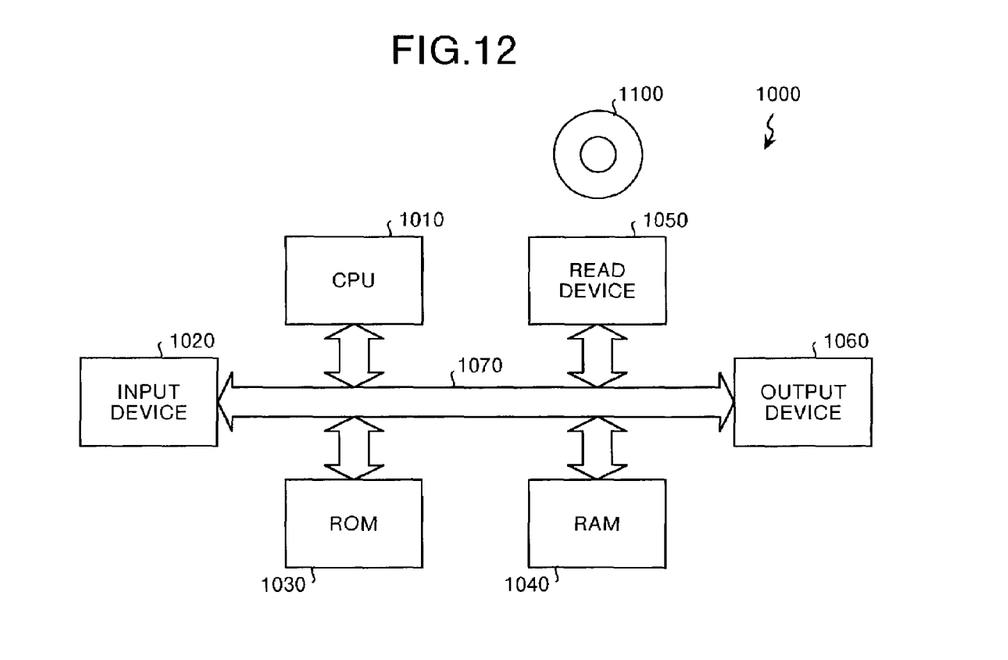
FIG. 12 is a block diagram which shows the configuration of a modification of the embodiment.

For example, in the embodiment described above, a program for realizing the functions of the delivery management server 300 or the portable terminal 500 is recorded on a computer readable recording medium 1100 shown in FIG. 12, and the program recorded on the computer readable recording medium 1100 is loaded on a computer 1000 shown in FIG. 12 and executed, so that a gift-valuable article exchange may be assisted. The computer readable recording medium 1100 may be a hard disk, an optical disk, a removable disk, or the like.

The computer 1000 shown in FIG. 12 is constituted by a central processing unit (CPU) 1010 which executes the program, an input device 1020 such as a keyboard and a mouse, a read only memory (ROM) 1030 which stores various data, a random access memory (RAM) 1040 which stores calculation parameters and the like, a read device 1050 which reads the program from the recording medium 1100, an output device 1060 such as a display and a printer, and a bus 1070 which connects the respective sections of the devices.

The CPU 1010 loads the program recorded on the recording medium 1100 through the read device 1050 and executes the program to assist the gift-valuable article exchange.

In the embodiment, a delivery trouble such as breakage of a gift occurs, the responsibility of defects may be placed on a delivery company or an insurance company. Further, in the embodiment, an exchange is not performed in delivery, exchange points are added, the exchange points are accumulated in the delivery management server 300, and a valuable article depending on the exchange points is sent to the receiver later on.

As described above, according to one aspect of the present invention, at the time of delivery, when a receiver decides a gift as an unwanted gift and the exchange possible/impossible unit determined that the gift is exchangeable, a predetermined service charge is calculated. A valuable article, to which the gift is actually exchanged, equivalent to a value obtained by subtracting the service charge from a value of the gift is then decided based on the exchange conditions. Therefore, it is advantageous that an exchange of the gift to the valuable article can be performed easily and efficiently.

Furthermore, at the start of a delivery affair, the delivery management information related to delivery of gifts is collectively downloaded from the delivery management device. Therefore, it is advantageous that the delivery affair can be performed more efficiently.

Moreover, the exchange result information related to an exchange of a gift and a valuable article actually exchanged is accumulated, and the exchange result information is shown to a receiver. Therefore, it is advantageous that the receiver can recognize what the gift is and can avoid an impolite attitude to a consignor.

Furthermore, upon completion of a delivery affair, the exchange result information is uploaded to the delivery management device. Therefore, it is advantageous that the delivery affair can be performed more efficiently.

According to another aspect of the present invention, at the time of delivery, when a receiver decides a gift as an unwanted gift and it is determined in the exchange possible/impossible step that the gift is exchangeable, it is possible to easily and efficiently exchange from the gift to a valuable article to which the gift can be actually exchanged. Because a predetermined service charge is calculated, and the valuable article equivalent to a value obtained by subtracting the service charge from a value of the gift is determined based on the exchange conditions. Further, at the start of the delivery affair, delivery management information related to delivery of gifts is collectively downloaded from the delivery management device. Upon completion of the delivery affair, the exchange result information is uploaded to the delivery management device. Therefore, it is advantageous that the delivery affair can be performed more efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gift-valuable article exchange assisting device comprising:
    a portable terminal carried by a delivery person, the portable terminal being configured to communicate with a delivery management server at a delivery company via a network to receive information on delivery requests which the delivery management server received from retail-store terminals installed at retail stores, wherein the portable terminal comprises:
    a memory unit which stores exchangeable article information that indicates whether a gift, which was ordered by a consignor and is to be delivered by a recipient, can be exchanged for an equivalent-value article, and stores exchange conditions in correspondence with the gift, wherein a sum of a value of the equivalent-value article and a predetermined service charge added is equivalent to a value of the gift;
    a determination unit which, when the recipient desires to exchange the gift delivered for another article, determines at the delivery site whether the gift can be exchanged for the equivalent-value article based on the exchangeable article information stored in the memory unit;
    a calculation unit which calculates at the delivery site the predetermined service charge when the determination unit decides that that exchange is possible;
    a decision unit which decides at the delivery site the equivalent-value article as a substitution for the gift based on the exchange conditions, when a value obtained by subtracting the service charge from the value of the gift is equivalent to the value of the equivalent-value article; and
    a printing unit which prints a statement describing contents of the gift, name of the consignor, and the equivalent-value article exchangeable, the statement being given to the recipient wherein the memory unit stores information related to gifts from a plurality of different gift sellers, and the valuable article to which the gift can be exchanged is from a source other than the gift seller originating the gift.

2. The gift-valuable article exchange assisting device according to claim 1 further comprising:
    a download unit which collectively downloads delivery management information related to the delivery of a gift from a delivery management device at the start of a delivery affair.

3. The gift-valuable article exchange assisting device according to claim 1 further comprising:
    an accumulation unit which accumulates exchange result information related to an exchange of the product and the equivalent value article actually exchanged; and
    a showing unit which shows the exchange result information to the recipient.

4. The gift-valuable article exchange assisting device according to claim 1 further comprising:
    an upload unit which uploads the exchange result information to the delivery management device upon completion of all the delivery affairs.

5. A gift-valuable exchange assisting method using a portable terminal carried by a delivery person, the portable terminal being configured to communicate with a delivery management server at a delivery company via a network to receive information on delivery requests which the delivery management server received from retail store terminals installed at retail stores, the method comprising:
    storing exchangeable article information that indicates whether a gift, which was ordered by a consignor and is to be delivered to a recipient, can be exchanged for an equivalent-value article, and storing exchange conditions in correspondence with the gift, in a memory unit, wherein a sum of a value of the equivalent-value article and a predetermined service charge added is equivalent to a value of the gift;
    collectively downloading delivery management information related to delivery of a gift from a delivery management device at the start of a delivery affair;
    determining at a delivery site, when the recipient desires to exchange the gift delivered for another article, whether the gift can be exchanged for the equivalent-value article based on the exchangeable article information stored in the memory unit;
    calculating at the delivery site the predetermined service charge when it is determined that the exchange is possible in the determination step;
    deciding at the delivery site the equivalent-value article as a substitution for the gift based on the exchange conditions when a value obtained by subtracting the service charge from the value of the gift is equivalent to the value of the equivalent-value article;
    uploading exchange result information to the delivery management device after completion of all delivery affairs; and
    printing at the delivery site a statement describing contents of the gift, name of the consignor and the equivalent-value article exchangeable, the statement being given to the recipient wherein the memory unit stores information related to gift from a plurality of different gift sellers, and the valuable article to which the gift can be exchanged is from a source other than the gift seller originating the gift.

6. A computer readable medium storing instructions used in a portable terminal carried by a delivery person, the portable terminal being configured to communicate with a delivery management server at a delivery company via a network to receive information on delivery requests which the delivery management server receives from retail store terminals installed at retail stores, which when executed by the portable terminal, causes the portable terminal to perform operations comprising:
    storing exchangeable article information that indicates whether a gift, which was ordered by a consignor and is to be delivered to a recipient, can be exchanged for an equivalent-value article, and storing exchange conditions in correspondence with the gift, in a memory unit, wherein a sum of a value of the equivalent-value article and a predetermined service charge added is equivalent to a value of the gift;

collectively downloading delivery management information related to delivery of a gift from a delivery management device at the start of a delivery affair;

determining at a delivery site, when the recipient desires to exchange the gift delivered for another article, whether the gift can be exchanged for the equivalent-value article based on the exchangeable article information stored in the memory unit;

calculating at the delivery site the predetermined service charge when it is determined that the exchange is possible in the determination step;

deciding at the delivery site the equivalent-value article as a substitution for the gift based on the exchange conditions when a value obtained by subtracting the service charge from the value of the gift is equivalent to the value of the equivalent-value article;

uploading exchange result information to the delivery management device after completion of all delivery affairs; and printing at the delivery site a statement describing contents of the gift, name of the consignor and the equivalent-value article exchangeable, the statement being given to the recipient wherein the memory unit stores information related to gift from a plurality of different gift sellers, and the valuable article to which the gift can be exchanged is from a source other than the gift seller originating the gift.

* * * * *

UNITED STATES PATENT AND TRADEMARK OFFICE
CERTIFICATE OF CORRECTION

PATENT NO. : 7,353,190 B2
APPLICATION NO. : 10/260568
DATED : April 1, 2008
INVENTOR(S) : Kuniaki Yamada et al.

It is certified that error appears in the above-identified patent and that said Letters Patent is hereby corrected as shown below:

Title Page, Column 2 (Foreign Patent Documents), Line 1, change "*   2/1997" to --*   12/1997--.

Title Page, Column 2 (Foreign Patent Documents), Line 2, above "JP    10-40463    2/1998" delete "JP   09-311888   12/1997"

Column 9, Line 33, after "delivered" change "by" to --to--.

Column 9, Line 47, before "exchange" change "that" to --the--.

Column 9, Line 54, after "prints" insert --at the delivery site--.

Column 9, Line 65, after "to" delete "the".

Column 9, Line 65, after "of" change "a" to --the--.

Column 10, Line 4, change "product" to --gift--.

Column 10, Line 5, change "equivalent value" to --equivalent-value--.

Column 10, Line 13, after "valuable" insert --article--.

Column 10, Line 51, change "gift" to --gifts--.

Column 12, Line 1, after "when" insert --,--.

UNITED STATES PATENT AND TRADEMARK OFFICE
CERTIFICATE OF CORRECTION

PATENT NO. : 7,353,190 B2
APPLICATION NO. : 10/260568
DATED : April 1, 2008
INVENTOR(S) : Kuniaki Yamada et al.

It is certified that error appears in the above-identified patent and that said Letters Patent is hereby corrected as shown below:

Column 12, Line 12, before "sellers," change "gift" to --gifts--.

Signed and Sealed this

Second Day of September, 2008

JON W. DUDAS
*Director of the United States Patent and Trademark Office*